United States Patent
Schonfeld et al.

(10) Patent No.: US 7,142,600 B1
(45) Date of Patent: Nov. 28, 2006

(54) OCCLUSION/DISOCCLUSION DETECTION USING K-MEANS CLUSTERING NEAR OBJECT BOUNDARY WITH COMPARISON OF AVERAGE MOTION OF CLUSTERS TO OBJECT AND BACKGROUND MOTIONS

(75) Inventors: Dan Schonfeld, Glenview, IL (US); Karthik Hariharakrishnan, Chicago, IL (US); Philippe Raffy, Sunnyvale, CA (US); Fathy Yassa, Soquel, CA (US)

(73) Assignee: NeoMagic Corp., Santa Clara, CA (US)

( * ) Notice: Subject to any disclaimer, the term of this patent is extended or adjusted under 35 U.S.C. 154(b) by 740 days.

(21) Appl. No.: 10/249,577

(22) Filed: Apr. 21, 2003

Related U.S. Application Data

(63) Continuation-in-part of application No. 10/248,348, filed on Jan. 11, 2003.

(51) Int. Cl.
  H04N 7/12 (2006.01)
  H04N 11/02 (2006.01)
  H04N 11/04 (2006.01)
  H04B 1/66 (2006.01)

(52) U.S. Cl. .............................. 375/240.16
(58) Field of Classification Search ................ None
  See application file for complete search history.

(56) References Cited

U.S. PATENT DOCUMENTS

| | | | |
|---|---|---|---|
| 5,635,986 A | 6/1997 | Kim | 375/240 |
| 5,936,671 A | 8/1999 | Van Beek et al. | 375/240.14 |
| 5,940,538 A | 8/1999 | Spiegel et al. | 382/286 |
| 6,075,875 A | 6/2000 | Gu | 382/107 |
| 6,137,913 A | 10/2000 | Kwak et al. | 382/236 |
| 6,169,573 B1 | 1/2001 | Sampath-Kumar et al. | 348/169 |
| 6,192,156 B1 | 2/2001 | Moorby | 382/286 |
| 6,236,680 B1 | 5/2001 | Chun et al. | 375/240.01 |
| 6,298,170 B1 | 10/2001 | Morita | 382/278 |
| 6,337,917 B1 | 1/2002 | Onural et al. | 382/107 |
| 6,389,168 B1 * | 5/2002 | Altunbasak et al. | 382/224 |
| 6,393,054 B1 | 5/2002 | Altunbasak | 375/240 |
| 6,400,846 B1 | 6/2002 | Lin et al. | 382/199 |
| 6,424,370 B1 | 7/2002 | Courtney | 348/143 |
| 6,466,624 B1 * | 10/2002 | Fogg | 375/240.27 |
| 2004/0090523 A1 * | 5/2004 | Kondo et al. | 348/46 |
| 2004/0091047 A1 * | 5/2004 | Paniconi et al. | 375/240.16 |
| 2005/0213660 A1 * | 9/2005 | Paniconi et al. | 375/240.12 |

OTHER PUBLICATIONS

D. Schonfeld and D. Lelescu,"VORTEX: Video retrieval and tracking from compressed multimedia databases-multiple object tracking from MPEG-2 bitstream."

(Continued)

*Primary Examiner*—Nhon Diep
(74) *Attorney, Agent, or Firm*—Stuart T. Auvinen

(57) ABSTRACT

An object in a video sequence is tracked by object masks generated for frames in the sequence. Macroblocks are motion compensated to predict the new object mask. Large differences between the next frame and the current frame detect suspect regions that may be obscured in the next frame. The motion vectors in the object are clustered using a K-means algorithm. The cluster centroid motion vectors are compared to an average motion vector of each suspect region. When the motion differences are small, the suspect region is considered part of the object and removed from the object mask as an occlusion. Large differences between the prior frame and the current frame detect suspected newly-uncovered regions. The average motion vector of each suspect region is compared to cluster centroid motion vectors. When the motion differences are small, the suspect region is added to the object mask as a disocclusion.

20 Claims, 12 Drawing Sheets

OTHER PUBLICATIONS

*Journal of Visual Communications and Image Representation*, Special Issue on Multimedia Database Management, vol. 11, pp. 154-182, 2000 (50pp).

Eickeler et al., "Content-Based Indexing of Images and Video using face Detection and Recognition Methods".
IEEE Int. Conference on Acoustics, Speech, and Signal Processing (ICASSP), 2001 (4pp).

* cited by examiner

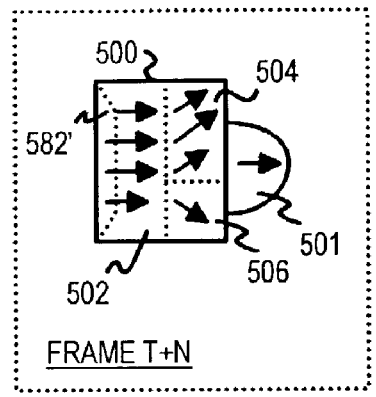
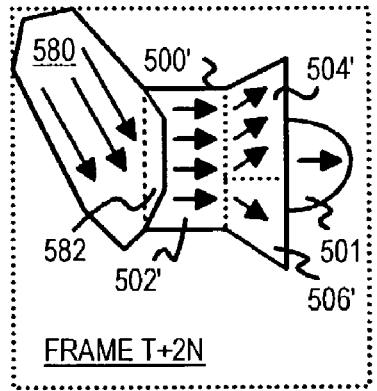
FIG. 9A  FIG. 9B
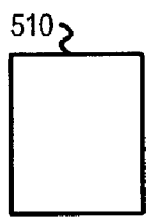
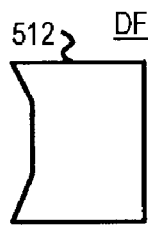
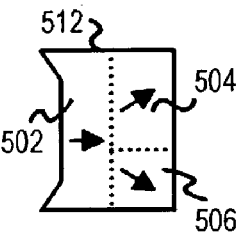
FIG. 9C  FIG. 9D  FIG. 9E
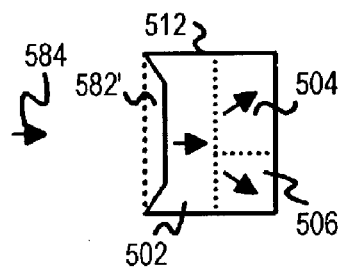
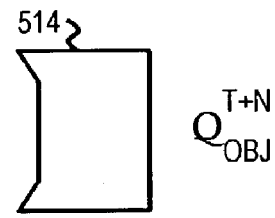
FIG. 9F  FIG. 9G

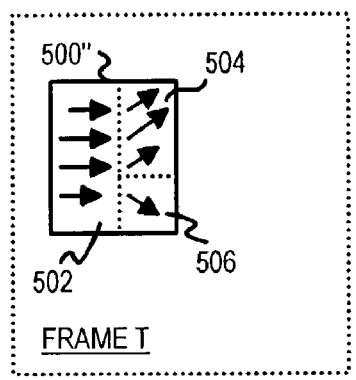
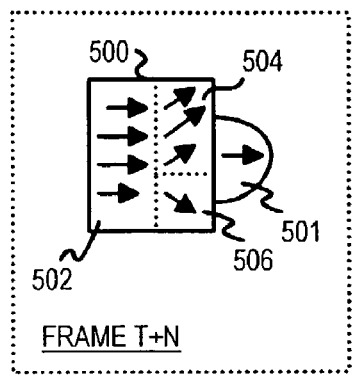
FIG. 9H  FIG. 9I
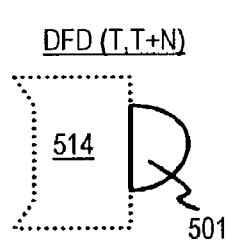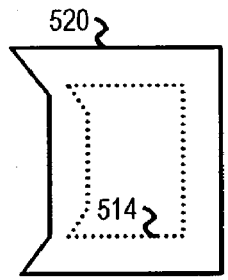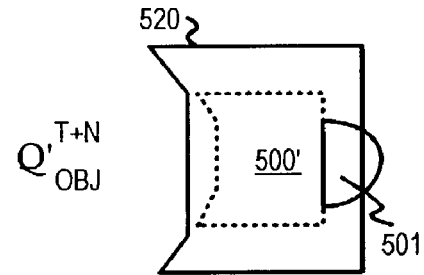
FIG. 9J  FIG. 9K  FIG. 9L
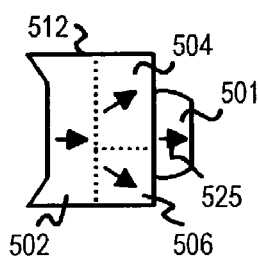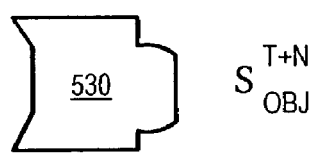
FIG. 9M  FIG. 9N OCCLUSION/DISOCCLUSION DETECTION USING K-MEANS CLUSTERING NEAR OBJECT BOUNDARY WITH COMPARISON OF AVERAGE MOTION OF CLUSTERS TO OBJECT AND BACKGROUND MOTIONS

CROSS REFERENCE TO RELATED APPLICATIONS

This application is a continuation-in-part of the co-pending application for Object Tracking Using Adaptive Block-Size Matching along Object Boundary and Frame-Skipping When Object Motion is Low, U.S. Ser. No. 10/248,348, filed Jan. 11, 2003.

BACKGROUND OF INVENTION

This invention relates to image processing, and more particularly to object tracking, contour prediction, and occlusion and disocclusion detection in a video sequence.

With increasing computational power, more complex operations may be performed on images, such as detecting foreground objects. Once the foreground object is located, it can be tracked through frames of a video sequence. Knowing the location of the foreground object in each frame allows video compression to be improved, since more computational resources and transmission bandwidth can be allocated to the foreground object while less is allocated for the background.

Software is desirable that detects foreground or moving objects, and draws bounding boxes or contours around the object in each frame of the video sequence. The parent application described in detail such object tracking using macroblocks. Near the boundary of the object, the macroblocks can be divided into smaller blocks to improve the tracked contour of the object. Such block-based object tracking can be performed more efficiently than other known object-tracking methods. Frames can be skipped when object motion is low, while faster object motion tracking proceeds frame-by-frame. Such tracking modulation was also described in the parent application. FIGS. 1–2 describe the modulated, block-based object tracking detailed in the parent application.

Blocks On Boundary Categorized as Uncertain

FIGS. 1A–C show motion estimation to categorize blocks as certain and uncertain blocks. FIG. 1A shows motion estimation for certain and uncertain (boundary) blocks. For a frame T in a video sequence, macroblocks in frame T+3 are compared to macroblocks in frame T to find the best-matching macroblock in frame T+3.

The location of the best-matching block in frame T determines the type of macroblock in frame T+3. There are three types:
blocks inside the object are certain blocks
blocks outside the object are background blocks
blocks that have the object's boundary passing through the block are uncertain blocks.

Each block in frame T+3 is categorized based on what type of block best matches in frame T. Block 15' in frame T+3 is categorized as a background block since the best-matching block 15 in frame T is outside the initial object contour for object 10. Block 12' in frame T+3 is categorized as a certain object block since the best-matching block 12 in frame T is inside the initial object contour for object 10 in frame T. Likewise block 14' in frame T+3 is categorized as a certain object block since the best-matching block 14 in frame T is also inside the initial object contour for object 10.

Blocks 16', 18' in frame T+3 is categorized as uncertain blocks since the best-matching blocks 16, 18 in frame T are along the initial object contour for object 10. The boundary of object 10 in frame T passes through blocks 16, 18.

The certain object blocks in frame T+3, such as blocks 12', 14', are shown in solid lines, while the uncertain blocks such as 16', 18' are shown with dashed lines. As the new object mask is being constructed for frame T+3, the certain blocks such as 12', 14' form the beginning or "seed" of the new object mask. The exact location of the boundary of object 10' is not yet known for frame T+3. However, it is relatively certain that the certain object blocks are part of object 10'.

The actual boundary for object 10' is somewhere within the dashed uncertain blocks, but the exact pixel locations of this boundary has not yet been determined for frame T+3. FIG. 1B shows the result of categorizing the blocks of frame T+3 as certain, uncertain, or background. Certain blocks 20 are within the new object mask being generated for frame T+3. Uncertain blocks 24 are along the boundary which has not yet been exactly determined. Background blocks 22 are outside the object. The object boundary is refined as shown later by adaptive-size block matching.

FIG. 1C shows motion vectors for background, certain, and uncertain blocks. Motion vectors for certain blocks 20 generally are uniform in direction and magnitude. Since these blocks typically do not include the boundary or some background pixels, they match well and have little error in their motion vectors.

Background blocks 22 often have many errors in their motion vectors, since the background may have little motion or a variety of motions. Also, the background blocks may lack differentiating features. The lack of such variations may result in aliasing, where a background block 22 matches many other blocks. For example, the water may be a relatively uniform blue without distinguishing features. A blue background block may match many other background blocks, resulting in errors in the background motion vectors.

Since uncertain blocks 24 often include some background pixels and some object pixels, finding good matches may be difficult. When the object changes shape due to rotation or z-axis motion, the location of the boundary changes and a match may not be found, or a match found with the wrong block. Thus errors in the motion vectors can occur along the boundary with uncertain blocks 24. More variation in the direction and magnitude of motion vectors is seen for uncertain blocks 24 than for certain blocks 22.

Average Object Motion Uses Certain, Not Uncertain Blocks

Only certain blocks 22 are used to calculate the average object motion. This reduces errors, since the poorly-matching and changeable uncertain blocks 24 are not included in the average. The motion vectors of certain blocks 22 usually show a lower variance than do the motion vectors of uncertain blocks 24. An average motion that more accurately represents the object's motion is produced.

Modulation

FIGS. 2A–B is a flowchart of modulated object tracking. FIG. 2A shows motion vector estimation and block categorization (certain, uncertain, background) while FIG. 2B shows calculation of the average motion of the object and selection of the modulation parameter. The procedures in FIGS. 2A–B are repeated for all macroblocks in the new frame T+N, where N is the modulation parameter. The number of frames skipped over is N−1.

In FIG. 2A, the new frame T+N is motion compensated and macroblocks in frame T+N are categorized based on the location of the matching macroblock in first frame T. The current macroblock in frame T+N is compared to a range of macroblocks in frame T and the closest matching block is determined. A sum-of-the-absolute difference (SAD) or a sum-of-squared differences method may be used as a measure of the similarity of the YUV or other pixels in the macroblocks being compared in frames T+N and T. The macroblock in frame T with the smallest pixel difference with the current macroblock in frame T+N is the best-matching block.

Once the best-matching macroblock in frame T is found, step 102, the relative displacement between the macroblocks in the two frames is calculated, such as the delta x and delta y values. This displacement is the motion vector for the block, step 104.

The location of the best-matching macroblock in frame T is compared to the object location in frame T. The object contour or object mask is already known for frame T but has not yet been generated for frame T+N. When the best-matching macroblock in frame T is within the object mask, step 106, then the macroblock in frame T+N can be marked as a certain block and can be added to the new object mask being constructed for frame T+N, step 110.

When the best-matching macroblock in frame T is not within the object mask, but is along the boundary of the object, step 108, then the macroblock in frame T+N is marked as an uncertain block, step 112. Uncertain blocks are not considered when calculating the average motion, but can be further processed by adaptive-size block matching.

When the best-matching macroblock in frame T is outside the object and not on the object boundary, it is marked as a background macroblock, step 114. When there are more macroblocks in frame T+N, the process of FIG. 2A is repeated, step 116, until all macroblocks have been processed in frame T+N. Then the process flow continues in FIG. 2B.

When a current macroblock in frame T+N being processed is a certain block, step 120, then the macroblock's motion vector is accumulated into an average, step 126. The next block in frame T+N is selected, step 122, and steps 120, 126 repeated until all macroblocks in frame T+N have been processed.

At the end of processing when step 124 is executed, a final average motion vector is available to be compared to a motion threshold, such as 5 pixels of movement. When the average motion vector of the certain blocks of the object exceed the motion threshold, step 132, then high motion exists, and the modulation parameter is set to a low value such as 1. The block-matching and motion estimation of FIG. 2A is repeated for the new frame T+N, such as T+1 rather than T+3, step 134.

When the average motion vector is less than the motion threshold, step 130, then slow or low motion is occurring, step 128, and the modulation parameter can be increased to a higher value such as N=3. The boundary of the object in the new frame T+N may then be refined by adaptive block matching 200.

FIGS. 3A–B show a video sequence with tracking of the contour of a foreground object when occlusion and disocclusion occur. In FIG. 3A, foreground object 10 is moving slowly to the right in frames T to T+3. In this example foreground object 10 is a fish that may be obscured by other objects such as bubbles or other fish or coral 13. Coral 13 partially obscures object 10 in frames T+1, T+2, and T+3. Occlusion of parts of object 10 occurs since coral 13 is in front of the fish.

Various algorithms exist that allow a computer or processor to extract the location of object 10 in frame T. For example, segmentation or watershed analysis can determine the contour or boundary of object 10 by the rapid change in color at the perimeter of object 10, which might be a yellow fish while the background is blue water.

Contour 11 of object 10 can be extracted as points along a line having a maximum gradient or change in color between the fish and the water. Similar contour extractions could be performed for subsequent frames T+1, T+2, and T+3 to generate contours 11', 11", and 11''' of FIG. 3B that track object 10 in these frames.

Unfortunately, coral 13 may be the same color as object 10, such as yellow coral blocking a yellow fish. This may cause part of coral 13 to be added to the object mask. Contours 11', 11", and 11''' then include some of coral 13 within the predicted contour of object 10. Coral parts 13', 13", and 13''' should not be part of fish contours 11', 11", and 11''' but are included by mistake.

Such additions to the object contour are dangerous, since after further processing of additional frames, the object tracked may change. If enough of coral 13 is added to contours 11', 11", and 11''', then in later frames coral 13 may be tracked rather than the fish, object 10.

Occlusion and disocclusion of other parts of the fish also occurs in this video sequence. The fish may be turning away from the viewer, causing its tail to shrink in size and even disappear by frame T+2. In a later frame T+3 the tail may suddenly reappear as the fish twists. The tail then needs to be added back into the object mask. Such additions to an object mask, or disocclusion, must be carefully made.

The inventors have realized that motion can be used to determine when to add or remove regions from an object mask. The inventors realize that regions belonging to an object tend to move together, while regions that are not part of an object tend to move in other directions, often in a more random manner when compared to the object motion. Thus motion can be better than color for generating object masks.

In FIG. 3C, motion vectors from various parts of the object mask are shown. Object 10 is moving to the right and has motion vector 17 in frame T+3. Coral parts 13', 13", and 13''' were mistakenly added to contours 11', 11", and 11'''. However, coral 13 is not moving with the fish but has an apparent backward motion due to camera pan. Thus coral parts 13', 13", and 13''' have small motion vectors pointing to the left. Since object 10 has larger motion vectors pointing to the right, it can be easily seen that coral parts 13', 13", and 13''' do not belong to object 10. Regions for coral parts 13', 13", and 13''' could thus be removed from contours 11', 11", and 11''' by comparing motion vectors of these regions to the fish's motion vector. The region motion vectors could be compared to an average motion vector for object 10.

A decision to include the re-emerging tail of the fish in frame T+3 can also be made using motion vectors. The re-emerging (disoccluded) tail has motion vector 15, which is closer to the fish's motion vector 15 than to the coral's motion vector. Thus the tail is added to object contour 11''' while coral part 13''' is removed from contour 11''' when motion vectors are considered.

What is desired is to improve the object tracking methods described in the parent application by adding occlusion and disocclusion detection. It is desired to adjust the predicted object contours by adding disoccluded regions and removing occluded regions from the object mask. It is further desired to use motion information to decide when to include or exclude regions from the object mask.

BRIEF DESCRIPTION OF DRAWINGS

FIGS. 9A–N show object masks during occlusion and disocclusion processing.

DETAILED DESCRIPTION

The present invention relates to an improvement in object tracking with occlusion and disocclusion. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 4:
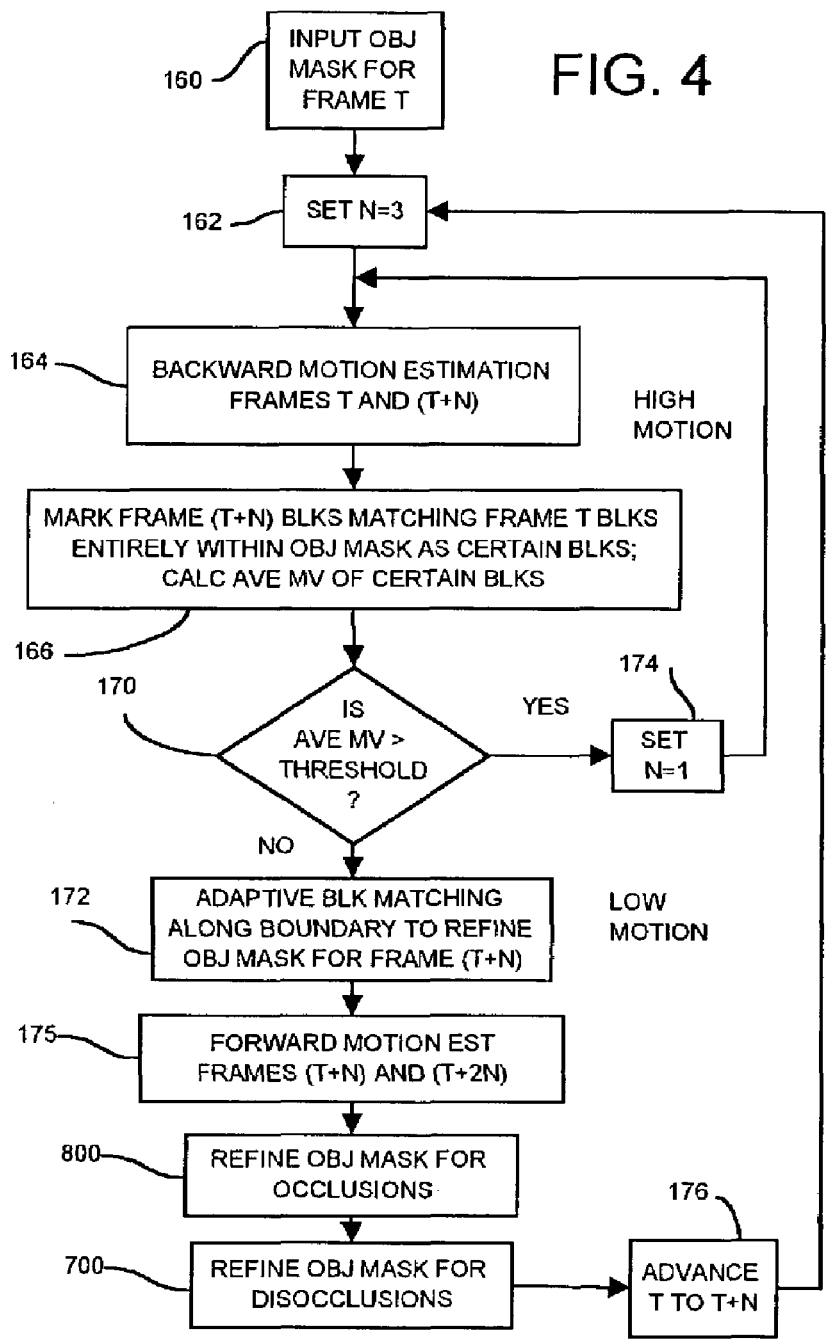
FIG. 4 is a simplified flowchart highlighting modulation of adaptive-block object tracking with occlusion and disocclusion processing.

Overall Flow—FIG. 4

FIG. 4 is a simplified flowchart highlighting modulation of adaptive-block object tracking with occlusion and disocclusion processing. The object-tracking method is a block-based tracking method that uses macroblocks and motion vectors such as are used in MPEG compression. Macroblocks in a current or new frame T+N are compared to blocks in a first frame T to find a best-matching block, and the displacement between the blocks in frames T and T+N is the motion vector for the block. Errors or differences between the block in frame T+N and frame T do not have to be calculated for object tracking itself, although error terms are calculated by compression methods.

The initial object mask for frame T is input, step 160. A user can manually draw a contour around the object, or an automated method can be used. This initial contour generation can be performed intermittently or only has to be performed once, for the first frame (T=1) in the video sequence being processed, or for the first frame that the object appears in.

The parameter N is the frame-modulation number, or the number of frames to skip ahead to. Object tracking is performed every N frames. When N=1, object tracking is performed every frame, while when N=3 object tracking is performed every third frame, and two frames are skipped. N is set to 3 when slow motion is detected, but set to one when high motion is detected.

Initially, the frame-modulation parameter N is set to 3, step 162. Backward motion estimation, step 164, is performed between new frame T+N and first frame T. Each macroblock in frame T+N is compared to a range of macroblocks in frame T to find the closest matching macroblock in frame T. A sum-of-absolute differences or least-variation of the YUV or other pixel color can be used to determine how well the blocks match. The displacement between the macroblock in frame T+N and the best-matching macroblock in earlier frame T is the motion vector for the macroblock in frame T+N.

Motion vectors for all macroblocks in frame T+N can be generated in step 164. The search range may be restricted, such as to a range of 32 pixels in any direction, or the entire frame T can be searched.

The location of each best-match block in frame T is compared to the object contour of frame T to determine if the best-matching block is within the object or outside the object or along the contour or boundary itself. Blocks along the boundary are specially processed by adaptive block sizes as described later.

Blocks in frame T+N that match a frame T block that is entirely within the initial object mask or contour and referred to as "certain" object blocks. Blocks in frame T+N that match a block in frame T that is entirely outside the initial object contour are also "certain" blocks, but are background blocks. Blocks in frame T+N that best match a block that includes the object boundary are referred to as "uncertain" blocks. The certain object blocks are marked and their average motion is computed, step 166.

The average motion of the object calculated in step 166 is compared to a threshold motion. When the average object motion exceeds this threshold motion, high motion is said to occur, step 170. Then the modulation parameter N is reset to 1, step 174, and motion estimation and average-motion calculation (steps 164–166) are repeated for the next frame T+1. Thus a finer granularity of frames for motion estimation is used when motion exceeds the threshold.

When the average object motion is below the threshold motion, low motion is occurs, step 170. Skipping frames is acceptable since the object is moving relatively slowly.

Figure 10:
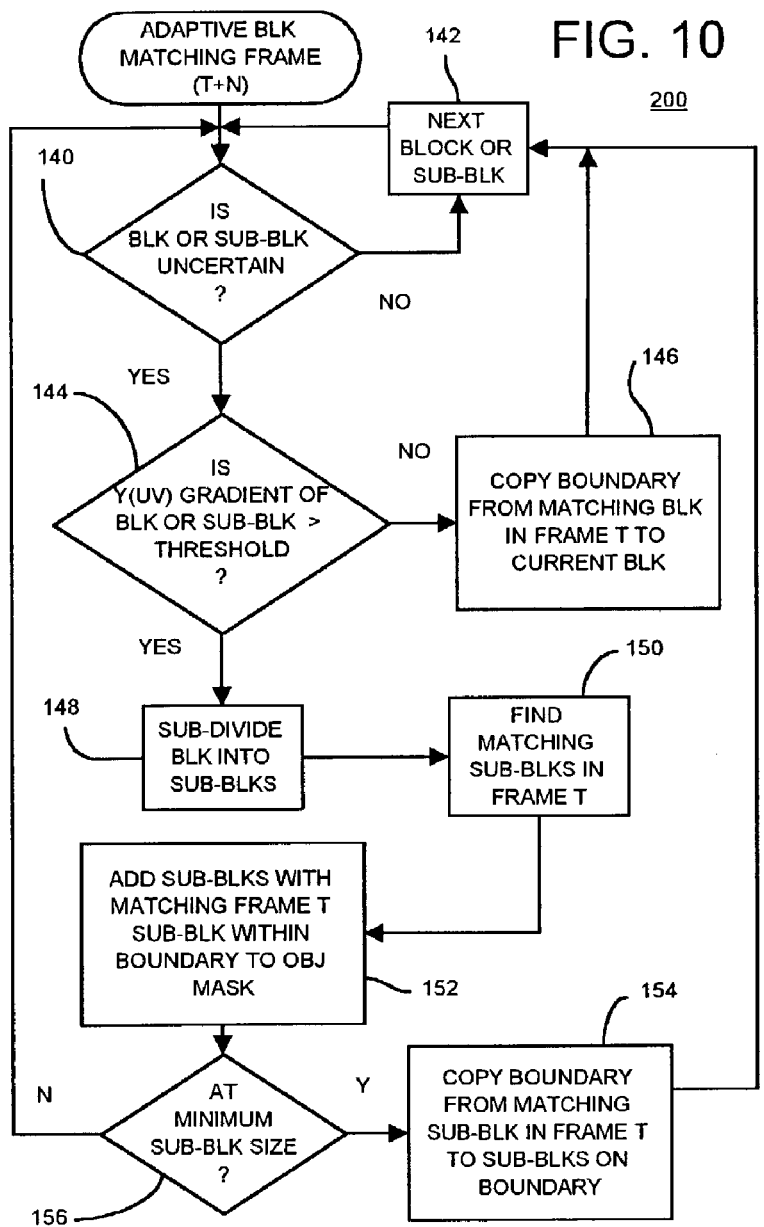
FIG. 10 is a flowchart detailing adaptive block matching along the object boundary.

The location of the object boundary is more precisely determined using adaptive block matching, step 172. The uncertain blocks lying on the object boundary are subdivided and matched using adaptive block matching (FIG. 10). Adaptive block matching sub-divides these boundary macroblocks into smaller-size blocks.

While backward motion estimation from frame T+N to frame T was performed in step 164 to generate the initial object mask, forward motion estimation from frame T+N to frame T+2N is performed in step 175. Forward and backward motions are used for occlusion/disocclusion processing.

Figure 7:
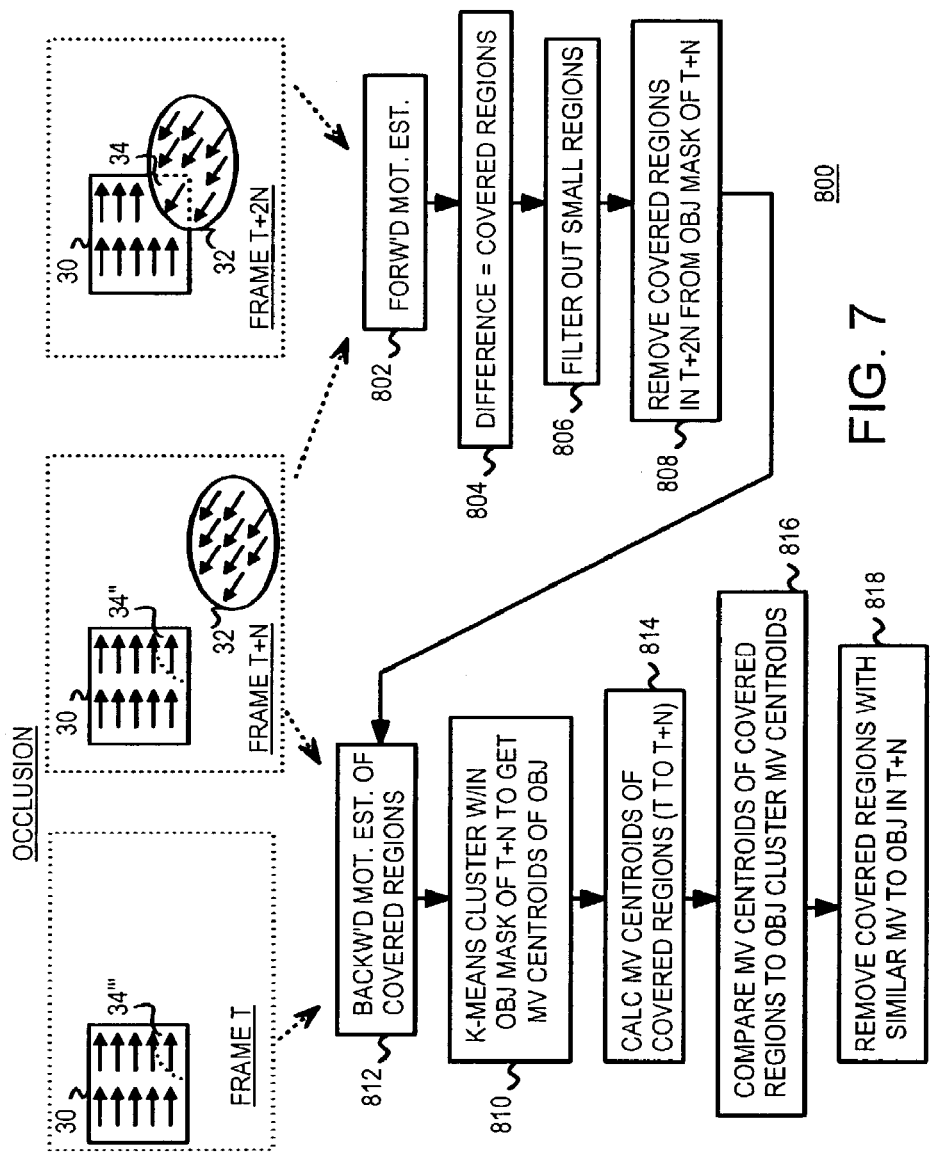
FIG. 7 includes a flowchart of occlusion processing.

Using the forward and backward motion vectors, the object mask is refined to remove occluded regions from the object mask, process 800 (FIG. 7). This can occur when another object passes in front of the object being tracked, obscuring part of the object.

Figure 8:
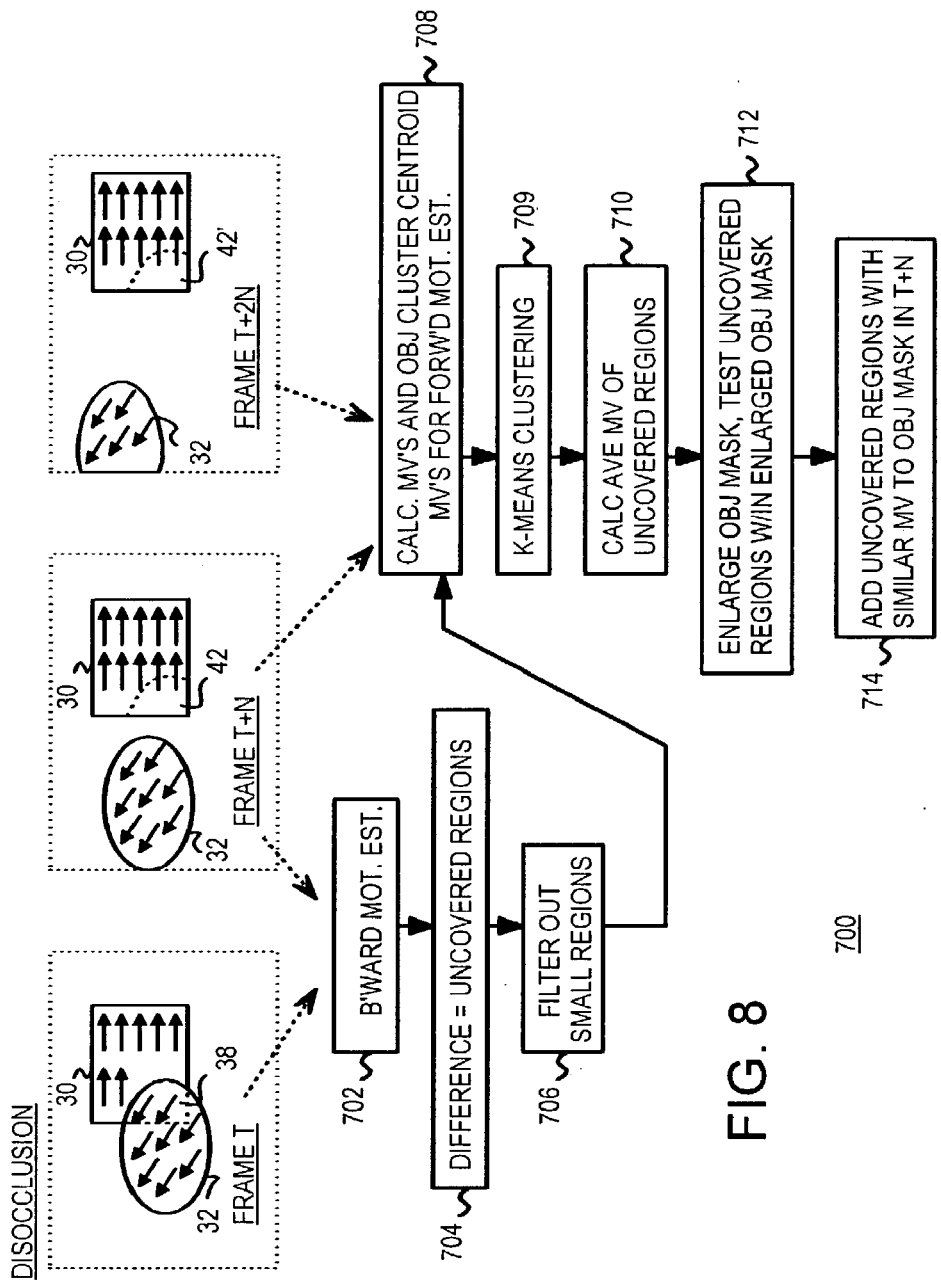
FIG. 8 includes a flowchart of disocclusion processing.

Also using the forward and backward motion vectors, the object mask is again refined to add disoccluded regions back into the object mask, process 700 (FIG. 8). This can occur when another object that earlier passed in front of the object moves beyond the object, revealing the hidden part of the object. Disocclusion and occlusion can also occur due to non-translational object motion, such as twisting, rotating, etc.

For low motion, the modulation parameter N remains set to 3. The video is advanced and the process repeated. The first frame T in the method is advanced to frame T+N, step 176. Frame T+N becomes frame T, while frame T+2*N becomes frame T+N as the video is advanced by step 176. Motion estimation and average-motion calculation (steps 164–166) are repeated for the new initial or base frame and the new current frame T+N. When N=1, the process flow passes through step 170 to step 176 even when the average motion exceeds the threshold. This is because N=1 is already as slow as possible.

Occlusion Example—FIGS. 5A–F

FIGS. 5A–F show an object occluding a tracked object and removal of occluded regions from the object mask. Object 30 is being tracked in frames T+N, T+2N, and T+3N in FIGS. 5A–C. Object 30 is moving to the right. Since object 30 is rigid and has no non-translational motion in this simple example, motion vectors for all regions of object 30 are similar, pointing to the right as shown.

Figure 5:
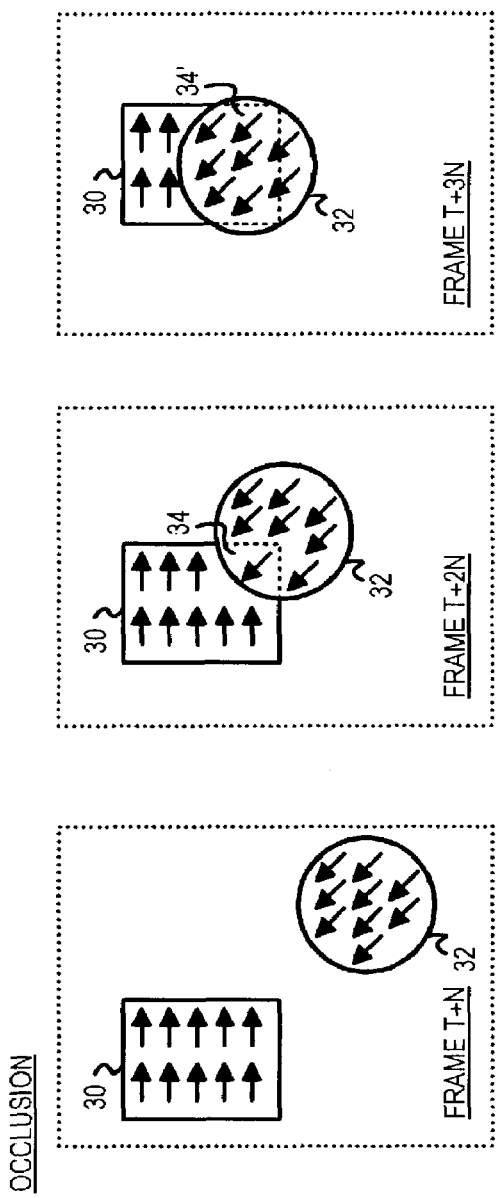
FIGS. 5A–F show an object occluding a tracked object and removal of occluded regions from the object mask.

Blocking object 32 is moving toward the upper left, and is also rigid and purely translational, with motion vectors pointing to the upper-left as shown. In FIG. 5B, object 32 begins to pass in front of object 30, occluding the lower right portion of object 30, occluded region 34. In FIG. 5C, object moves to block more of object 30, so that occluded region 34' is larger than the un-obscured part of object 30.

FIG. 5D shows the initial object mask 36 for object 30 in frame T+N. In FIG. 5E, occluded region 34 should be removed from mask 36'. Otherwise, part of blocking object 32 would be included in the object mask for object 30. In FIG. 5F, occluded region 34' has grown, and object mask 36" has shrunk further due to occlusion.

Disocclusion Example—FIGS. 6A–F

FIGS. 6A–F show an object disoccluding a tracked object and addition of disoccluded regions into the object mask. Object 30 is being tracked in frames T, T+N, and T+2N in FIGS. 6A–C. Object 30 is moving to the right while blocking object 32 is moving toward the upper left. Both objects are rigid and purely translational, with motion vectors pointing as shown.

Figure 6:
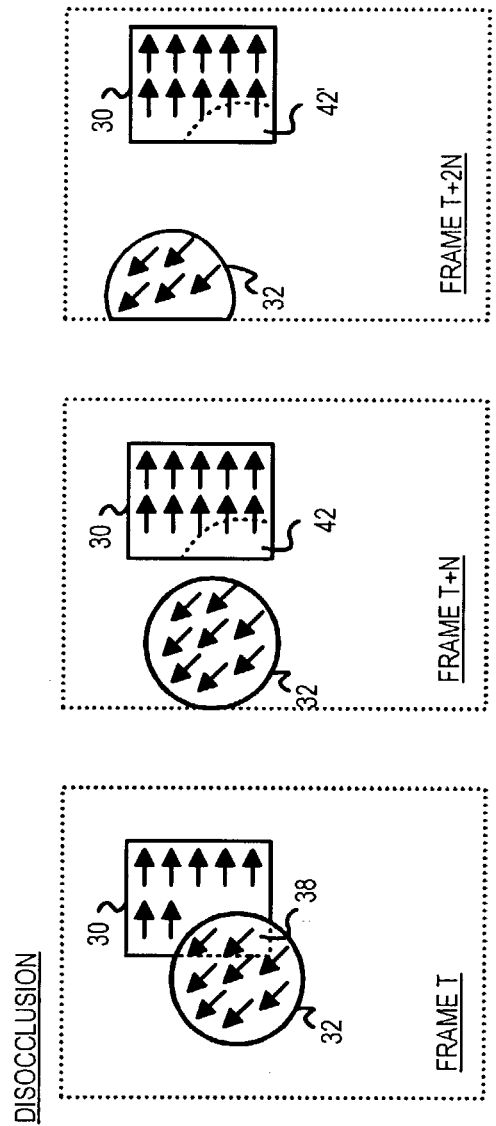
FIGS. 6A–F show an object disoccluding a tracked object and addition of disoccluded regions into the object mask.

In FIG. 6A, in frame T blocking object 32 is still obscuring region 38 of object 32. Object mask 40 of FIG. 6D has region 38 removed, perhaps due to an earlier detection of occlusion.

In frame T+N, shown in FIG. 6B, object 32 moves away from object 30, uncovering or disoccluding the lower left portion of object 30, disoccluded region 42. In FIG. 6E, region 42 is added back into object mask 40'.

In FIG. 6C, for frame T+2N, object 32 moves farther from object 30. Object mask 40' of frame T+N can be matched with object 30 of frame T+2N, allowing tracking to continue. Formerly obscured region 42' matches region 42 of mask 40'. FIG. 6F shows the new object mask 40" generated for frame T+2N.

Actual objects may not be rigid and may have non-translational motion. These more difficult types of objects may still be tracked by comparing motion vectors for suspected occluded or disoccluded regions to an average motion vector for the object. Non-translational motion usually cannot be described by just one average. Clustering of motion vectors is used for this case. The motion of the object can be better described using cluster centroids. The averaging of the object motion vectors allows for a simpler comparison of vectors even when the object is moving in a non-translational manner or is changing in apparent shape. One average motion vector or centroid for the object can be compared to the average or centroid motion vector for a suspected occluding or disoccluding region.

Occlusion Process—FIG. 7

FIG. 7 includes a flowchart of occlusion processing. Occlusion detection process 800 performs forward motion estimation between frames T+N and T+2N, step 802. The object mask for frame T+N has just been generated, such as by adaptive block matching, but has not yet been adjusted for occlusions and disocclusions.

In this example, detection of a future occlusion occurs as blocking object 32 blocks object 30 in frame T+2N but not in frames T+N and T. Occluded region 34 is removed from the object mask for frame T+N before the occlusion actually occurs to allow the object mask for frame T+N to match the occluded object in future frame T+2N. For displaying the object in frame T+N, the object is displayed without removing the occluded region. For the computation of the object mask in the next frame (T+2N), the object mask with occluded regions removed is used. For display of frame T+N, the full object is shown since occlusion happens at frame T+2N.

Frame T+N is motion compensated with frame T to produce a motion-compensated frame (T+N)'. This motion-compensated frame (T+N)' from step 802 is subtracted from the original frame T+N to produce the displaced frame difference (DFD), step 804. Differences that are greater than a threshold are considered to be newly covered regions, since regions that disappear cannot be matched and produce large differences. A binary mask can be made of these covered regions within the object mask. These suspect regions with large differences within the object mask may correspond to obscured regions or they may be noise. Suspect regions outside the object mask are discarded, and suspect regions that are not near the border can also be ignored as noise.

Various filtering can optionally be applied, step 806, to remove small regions that may represent noise rather than newly covered regions within the object mask. For example, a 5-by-5 pixel kernel can be used for median filtering the DFD. Then several opening and closing operations can be performed to try to join smaller regions with larger ones. Regions that are still smaller than a threshold can then be removed.

The filtered differences represent regions that are suspected of being covered in frame T+2N. In step 808 these covered regions are removed prior to clustering from the object mask for frame T+N, which is the last frame processed before occlusion occurs (occlusion has not yet occurred in frame T+N, but the object mask is adjusted for comparison to future frames such as T+2N).

Motion Similarity Test

These suspected regions may or may not be part of the object. If the region is not part of the object, it cannot be a real occlusion. To determine whether the suspect region was part of the object in prior frames, a motion similarity test is used. The prior motion of each suspect region in frames T and T+N, before the occlusion occurs, is compared to the motion of the tracked object. If the region's motion is similar to the object motion in frames T and T+N, the region is probably part of the object and represents a real occlusion in frame T+2N. The suspect region with similar motion should be removed from the object mask as an occlusion. If the region's motion is not similar to the object motion, the region is probably just noise and not part of the object. The noisy region should not be removed from the object mask but should be ignored.

Object Divided into Clusters

Rigid objects could be represented by a single motion vector for the whole object. However, many real-world objects are not rigid. Instead, portions of the object can move differently than other portions, such as a person swinging his arms as he walks. The inventors have discovered that better tracking occurs when the object is divided into smaller portions called clusters. Rather than compare each suspect region's motion to an average motion for the entire object, the object is divided into one or more clusters. The average motion vector for each cluster is determined, and is known as the cluster centroid. Motion vectors used are those for motion between frames T and T+N, the backward motion vectors already calculated, step 812.

A variance-minimizing algorithm can be used to determine which blocks in the object are assigned to which clusters. For example, a K-means algorithm can be used where the number of clusters K is adaptively estimated. First, all blocks can be assigned to one cluster, and the variance in motion vectors calculated. Then K can be set to 2 clusters, and each block randomly assigned to one cluster or the other. The blocks can then be re-assigned to the cluster that better fits their motion using one or more iterations. Other numbers of clusters (K=3, 4, 8, etc.) can be tested and iterated in a similar manner. The number of clusters that produces the minimum variance between the cluster centroid motion vector and each block's motion vector can be chosen as the best-fit number of clusters and assignment of blocks to clusters.

Rather than calculate the K-means algorithm to full convergence, a threshold can be tested against for each successively larger value of K. For each number of clusters K, the final difference between the block and centroid motion vectors is calculated for each block. When a large fraction of the blocks have a final difference greater than the threshold, then K is increased and clustering repeated for the larger number of clusters. This can be repeated until a small fraction of the blocks have differences less than the threshold, such as no more than 10% of the blocks. Alternately, when increasing the number of clusters K increases the differences, then the smaller value of K is used as the final cluster assignment. The ideal number of clusters K is typically 2 to 4 for many objects tracked, but can have other values.

During K-means clustering, step 810, only the blocks within the object mask that are not suspected of being obscured are clustered. Suspect regions were already removed from the object mask in step 808. Removal of suspect regions produces better accuracy of object motion since the suspect regions may be noisy or not part of the object.

When a block is not fully within the object, such as for a boundary block, a weighting can be used. The block's contribution to the centroid motion vector is reduced by the fraction of pixels in the block that are outside the object. Blocks are ideally macroblocks that were motion estimated in step 812, but could be other blocks or regions that had motion vectors calculated between frame T and T+N.

Suspect Region Motion Compared to Cluster Centroid Motions

In step 812, motion vectors between frames T and T+N are read and averaged for the region, or re-generated for the suspect regions that were removed from the object mask of frame T+N in step 808. These suspect regions are suspected of being obscured. The regions could be blocks such as macroblocks, but then removal of these block-shaped regions could leave blocky staircase edges on the object mask. Instead, the inventors prefer to allow the regions to be irregular, having whatever shape and size remain after filtering out smaller regions in step 806. One backward motion vector average is generated for each suspect region, step 814, such as by averaging motion vectors for blocks or pixels within the region.

Each suspect region's motion vector is compared to the centroid motion vectors for all clusters in the object, step 816. The absolute-value difference between the suspect region's motion vector and the cluster motion vector is calculated for all combinations of suspect regions and object clusters. For each suspect region, the object cluster having a centroid motion vector that has the smallest difference with the region's motion vector is chosen as the best-fit cluster. The best-fit cluster is the object cluster than has a motion that most closely matches the motion of the suspect region.

When the smallest difference is greater than a threshold value, then the differences in motion are too large for the suspect region to be part of the object. However, when a suspect region's smallest difference is below the threshold value, then the motions of the suspect region and best-fit cluster of the object are close enough for the suspect region to be part of the object.

Suspect regions with motions close enough to one of the object clusters are removed from the object mask for frame T+N as occluded regions of the object, step 818. Suspect regions with dissimilar motions that were removed from the object mask in step 808 can be added back into the object mask after occlusion processing is complete, since these regions represent noise rather than actual object occlusions.

The prior motion, before the occlusion occurs, is what is compared to determine if a suspect region is really part of the object or is simply a noisy artifact. For example, region 34 is occluded in frame T+2N. Region 34 corresponds to region 34" in frame T+N, which is a suspect region detected by the DFD frame difference (step 804). The prior motion of region 34''' in frame T and region 34" in frame T+N are compared to the object clusters in these frames T and T+N for the motion similarity test. When prior motions match, the suspect region is part of the object and can be removed as a future occlusion.

Disocclusion Process—FIG. 8

FIG. 8 includes a flowchart of disocclusion processing. Disocclusion detection process 700 uses backward motion estimation between frames T+N and T, step 702. These motion vectors may already have been calculated in earlier processing, such as step 164 of FIG. 4. The object mask for frame T+N has already been generated and has been adjusted for occlusions but not yet for disocclusions.

In this example detection of a current disocclusion occurs as blocking object 32 uncovers part of object 30 in frame T+N. Disoccluded region 42 is added to the object mask for frame T+N when the disocclusion actually occurs to allow the object mask for frame T+N to match the disoccluded object with region 42' in future frame T+2N.

The motion-compensated frame from step 702 is subtracted from the original frame to produce the displaced frame difference (DFD), step 704. Differences outside the predicted object mask that are greater than a threshold are considered to be newly uncovered regions, since regions that suddenly appear out of nowhere cannot be matched and produce large differences. A binary mask can be made of these uncovered regions. These new regions may really be part of the object, or they may be noise.

Various filtering can optionally be applied, step 706, to remove small regions that may represent noise rather than newly uncovered regions. For example, a 5-by-5 pixel kernel can be used for median filtering the DFD. Then several opening and closing operations can be performed to try to join smaller regions with larger ones. Regions that are still smaller than a threshold can then be removed from further disocclusion processing.

The filtered differences represent regions that are suspected of being uncovered in frame T+N. These newly uncovered regions are not part of the object mask for frame T+N, which is the first frame processed that disocclusion occurs (disocclusion has not yet occurred in frame T, but the object mask is adjusted for comparison to future frames such as T+2N).

Motion Similarity Test

These suspected regions may or may not represent actual disocclusions. To determine whether an actual disocclusion has occurred, a motion similarity test is used. The motion of each suspect region is compared to the motion of the tracked object. If the region's motion is similar to the object motion, the region is included in the object mask (disocclusion). If the region's motion is not similar to the object motion, the region is not included in the object mask (no disocclusion). Dissimilar motions indicate noise.

The forward motion vectors between frames T+N and T+2N were generated for the object in step 802 of FIG. 7. These forward motion vectors for the object can be re-used, step 708, or they may be re-generated. The object that now includes the suspect regions that were not occlusions is re-clustered with a K-means process using the forward motion vectors between frames T+N and T+2N, step 709 The forward motion vectors are read and averaged for the suspect regions, or re-generated, step 710, for each suspected uncovered regions from step 706. Since these suspected uncovered regions have arbitrary shapes, motion compensation and motion vectors may be re-computed by matching the suspected uncovered regions or generated by averaging motion vectors already calculated.

Since adding a suspected uncovered region into the object mask can eventually result in tracking the wrong object if the suspect region is really from a different object, stricter requirements can be used for disocclusion than for occlusion processing. In particular, a special test is included for disocclusion processing. The object mask is enlarged by a certain amount, such as by 30% or 4–5 pixels. Then suspected uncovered regions that lie outside the enlarged object mask are removed from further processing, since they lie too far from the object. Suspected regions within the enlarged object mask are tested using the motion similarity test with the object clusters, step 712.

Each suspect region's motion vector is compared to the centroid motion vectors for all clusters in the object in step 712. The absolute-value difference between the suspect region's motion vector and the cluster motion vector is calculated for all combinations of suspect regions and object clusters. For each suspect region, the object cluster having a centroid motion vector that has the smallest difference with the region's motion vector is chosen as the best-fit cluster. The best-fit cluster is the object cluster than has a motion that most closely matches the motion of the suspected uncovered region.

When the smallest difference is greater than a threshold value, then the differences in motion are too large to include the suspect region in the object mask. However, when a suspect region's smallest difference is below the threshold value, then the motions of the suspect region and best-fit cluster of the object are close enough to include the suspect region in the object mask. These suspected uncovered regions with motions that are close enough to one of the object clusters are added into the object mask for frame T+N, step 714. Suspect regions with dissimilar motions or that are too far from the object are not added to the object mask.

Example of Occlusion and Disocclusion Processing

FIGS. 9A–N show object masks during occlusion and disocclusion processing. FIG. 9A shows object 500 in frame T+N that can be divided into 3 clusters 502, 504, 506 using a variance-minimizing technique such as K-means to group macroblocks with similar motion vectors together. FIG. 9B shows object 500' in frame T+2N, which is partially obscured by blocking object 580. Obscured or covered region 582 of object 500' is blocked by blocking object 580.

Figure 1A:
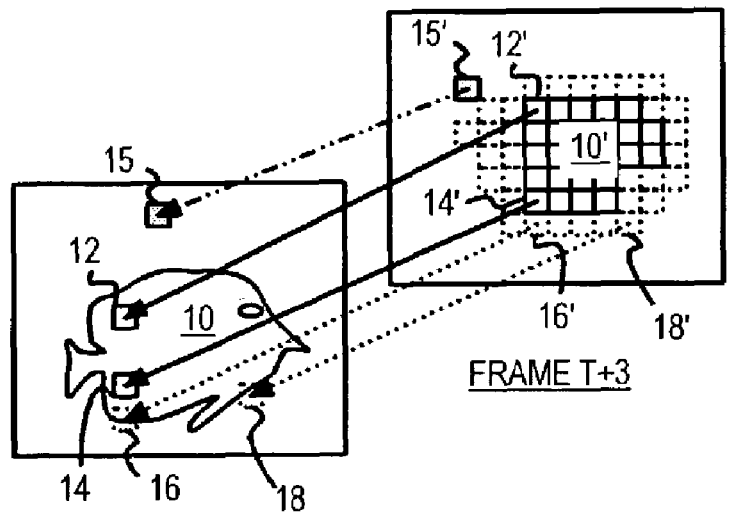
FIGS. 1A–C show motion estimation to categorize blocks as certain and uncertain blocks.
Figure 1B:
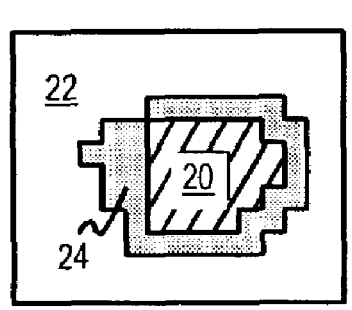
Figure 1C:
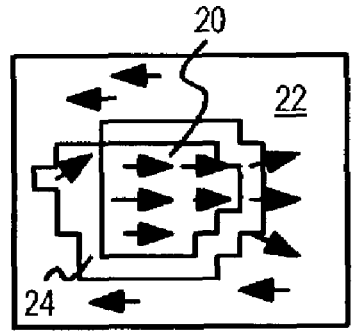
Figure 2A:
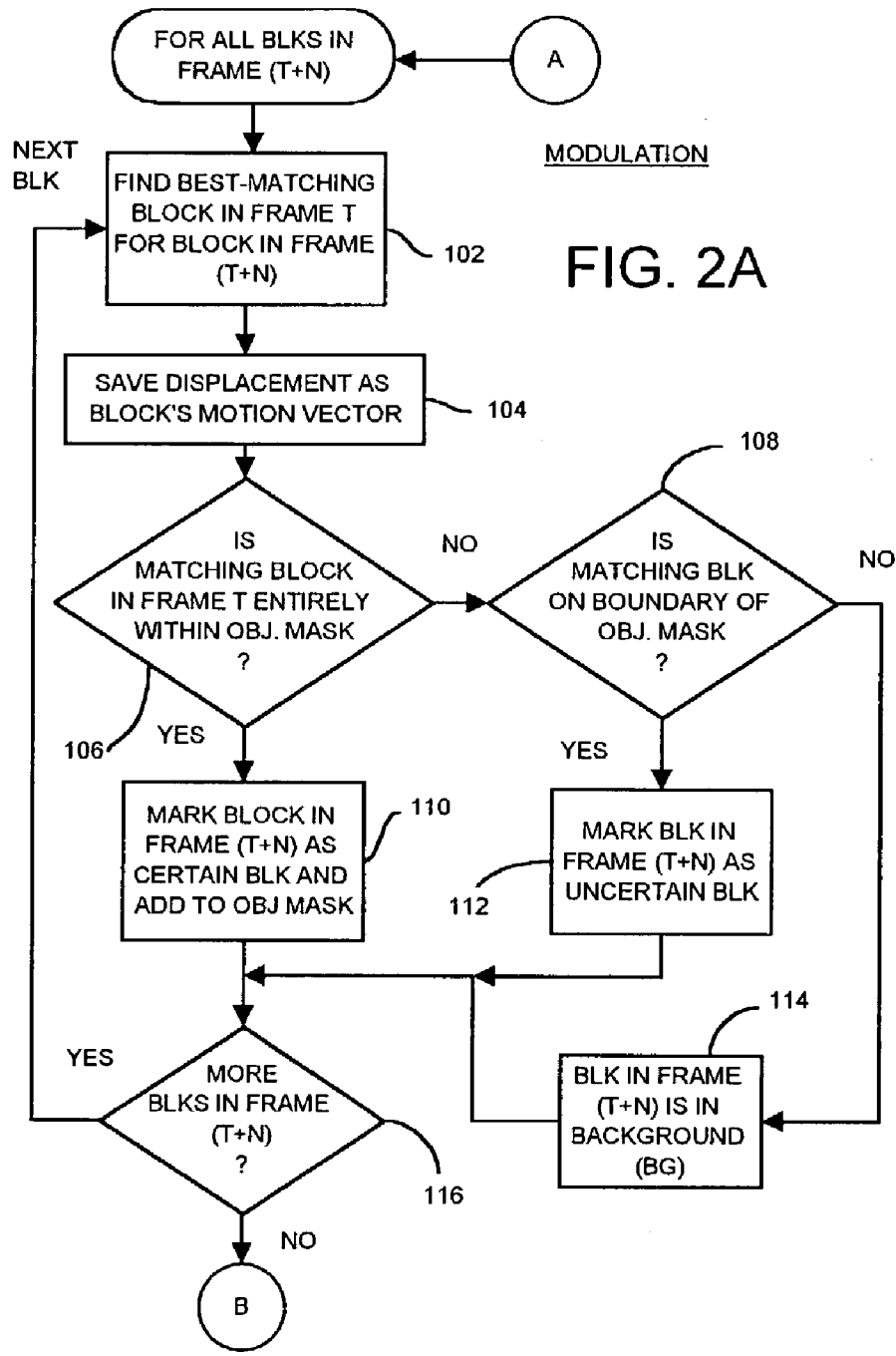
FIGS. 2A–B is a flowchart of modulated object tracking.
Figure 2B:
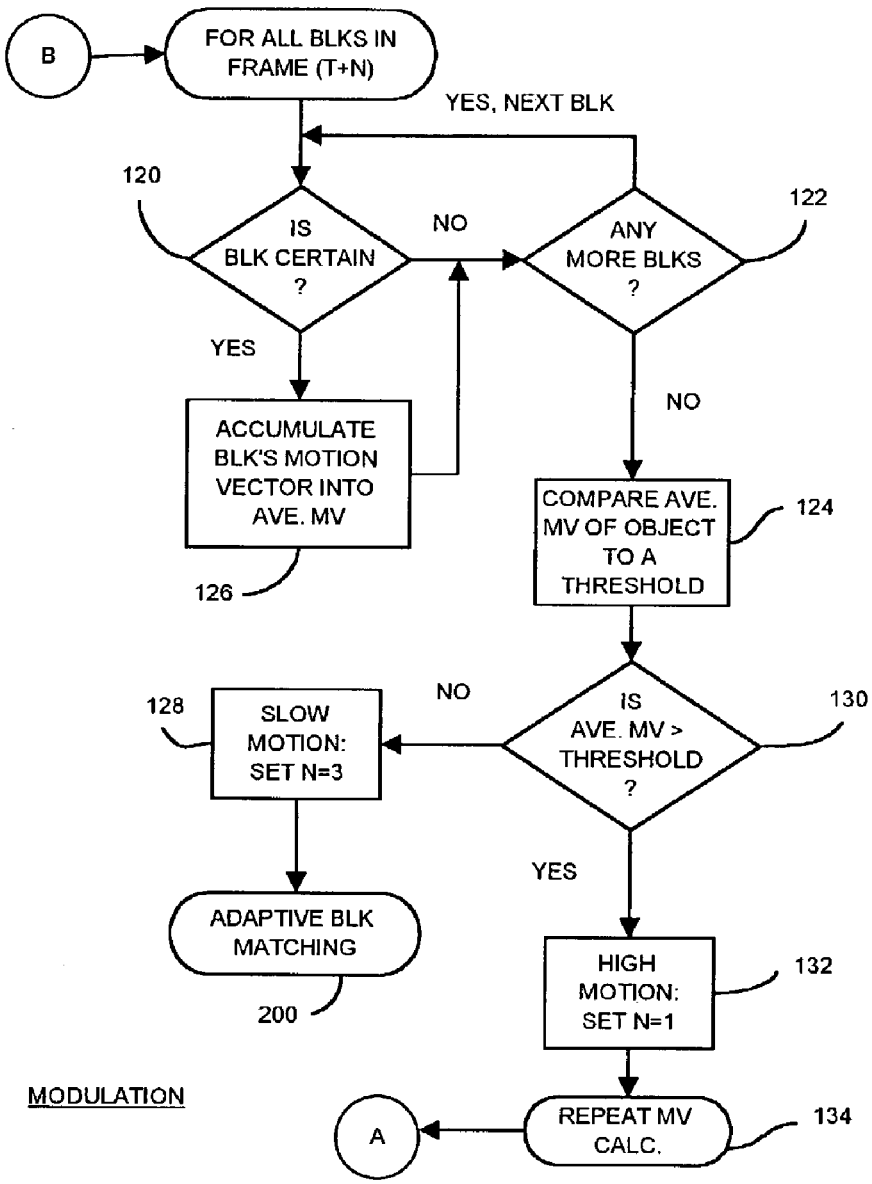
Figure 3A:
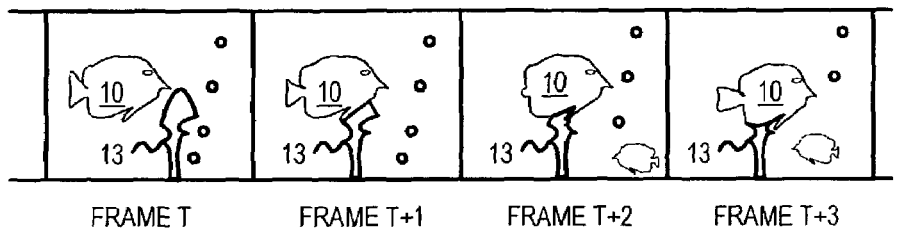
FIGS. 3A–C show a video sequence with tracking of the contour of a foreground object when occlusion and disocclusion occur.
Figure 3B:
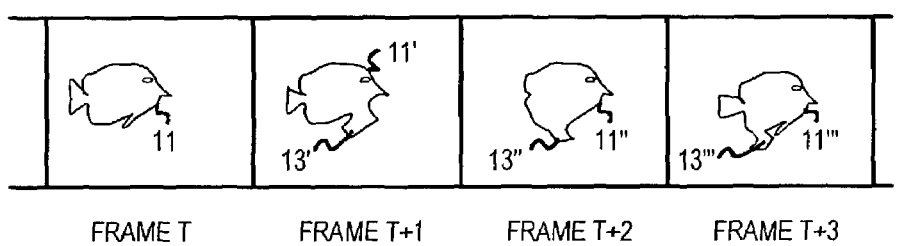
Figure 3C:
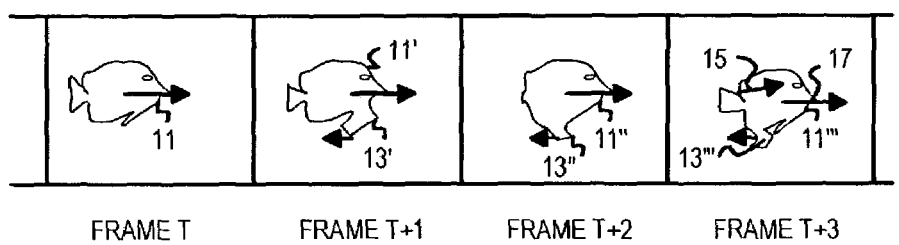

The predicted shape of object 500 changes between frames T+N and T+2N. Since the motion of cluster 504 is slightly more upward than for cluster 502, cluster 504' grows upward in object 500'. Likewise the motion of cluster 506 is slightly more downward than for cluster 502, so cluster 506' has a downward extension in object 500'. These changes to the shape of object 500 are predicted by motion vectors of macroblocks in object 500. Such changes in the shape of the object mask are detected before occlusion and disocclusion processing, such as by adaptive block matching (step 172 of FIG. 4) or earlier macroblock matching (steps 102, 104 of FIG. 2A).

New region 501 of object 500 does not have corresponding macroblocks in object 500 that can be matched during motion compensation. Instead, new region 501 seems to appear out of nowhere, being a newly uncovered region. Such disoccluded regions can occur due to movement away of a blocking object, such as will eventually occur in future frames as blocking object 580 moves past object 500'. However, in this example, new region 501 appears due to non-translational motion of object 500. For example, as a fish swims in the x direction, it waves its tail back and forth in the z direction. The fish's tail may suddenly re-appear due to this twisting and rotational motion of the fish's body.

FIG. 9C shows the object mask after block matching but before occlusion processing. The contour of the object is adjusted to reflect motion vectors of macroblocks within the object. This predicted contour is the object mask, the expected object position in frame T+N. Object mask 510 in frame T+N is generated by motion compensation between frames T and T+N, and is referred to as $P_{obj}^{T+N}$. This is the predicted shape of object 500 in frame T+N.

The object mask in frame T+N, $P_{obj}^{T+N}$, is adjusted to remove all suspect regions that may be covered in frame T+2N. A displaced frame difference (DFD) between frames T+N and T+2N produces a large difference for the left-most part of cluster 502, since it matches covered region 582 in frame T+2N. This suspect region is removed from the object mask in frame T+N to produce the new object mask 512, known as $P_{new\_obj}^{T+N}$. Since new region 501 is outside object mask 510, it is not considered for occlusion processing, even though the DFD can produce a large difference for this area.

Backward motion vectors for the object between frames T and T+N are read or generated. The motion vectors for the object within new object mask 512 (without the suspect regions) are then clustered. The optimal grouping of motion vectors produces three clusters 502, 504, 506. The centroid motion vector for cluster 504 is slightly more upward than the centroid motion vector for cluster 502, while the centroid motion vector for cluster 506 is slightly more downward than the centroid for cluster 502.

FIG. 9F shows the motion similarity test being performed on a suspected covered region. The average backward motion vector 584 for covered region 582' in frames T and T+N is generated and points to the right with a small magnitude. Motion vector 584 has a similar motion to cluster 502. Region 584 is the region of the object that was not obscured in frames T+N and T. As a result of occlusion processing, region 582 is found to belong to the object in frame T+N will be covered by object 580.

When motion vector 584 is compared to the centroid motion vector for cluster 502, the magnitude and direction differ by a small amount, less than the threshold. Since this difference with best-match cluster 502 is smaller than the threshold, covered region 582' is classified as being part of object 500. Since region 582 is later obscured in frame T+2N, it is removed as an obscured region that is not part of object 500'.

In FIG. 9G covered region 582' is removed from updated object mask 514 due to the motion similarity. Updated object mask 514 is the result of occlusion processing, and is designated $Q_{obj}^{T+N}$.

FIG. 9H shows prior frame T while FIG. 9I is a copy of FIG. 9A (frame T+N), showing that new region 501 in objects 500, is not found in object 500" in frame T.

For disocclusion processing, the displaced frame difference (DFD) is again performed, but between frames T and T+N rather than T+N and T+2N. This time only regions outside of updated object mask 514, after occlusion processing, are considered. FIG. 9J shows that new region 501 has a high DFD and is outside updated object mask 514, so new region 501 is a suspected uncovered region.

In FIG. 9K, updated object mask 514 is enlarged to generate dilated object mask 520, known as $Q'_{obj}^{T+N}$. Such enlargement can be by a fixed number of pixels or by a certain fraction or percentage of the size of object 500 such as 120%.

FIG. 9L shows that new region 501 falls mostly within dilated object mask 520. The portion of new region 501 that falls within dilated object mask 520 is tested for motion similarity in FIG. 9M.

FIG. 9M shows the motion similarity test being performed on a suspected newly uncovered region. The average motion vector 585 for new region 501 is generated and points to the right with a small magnitude. Motion vector 525 has about the same motion as object 500. When motion vector 525 is compared to the centroid motion vector for cluster 504, the magnitude and direction differ by very little, much less than the threshold. Likewise, subtracting motion vector 525 from the centroid motion vector for cluster 506 produces a small difference in magnitude and direction. The smallest difference is between motion vector 525 and the centroid motion vector for cluster 502. Since this difference with best-match cluster 502 is smaller than the threshold, new region 501 is classified as being a disoccluded region that is part of object 500.

In FIG. 9N new region 501 is added to updated object mask 514 due to the motion similarity. Final object mask 530 is the result of occlusion and disocclusion processing, and is designated $S_{obj}^{T+N}$. Note than only the portion of new region 501 that is within dilated object mask 520 is added to the object mask.

Adaptive Block Matching—FIG. 10

FIG. 10 is a flowchart detailing adaptive block matching along the object boundary. Adaptive block matching 200 refines the boundary of the object mask in the new frame T+N. Macroblocks can be selected in a sequence and each examined to determine if it is an uncertain block, step 140. When the block is not an uncertain block, the next macroblock is examined, step 142, until all uncertain blocks in frame T+N have been processed. Rather than checking all blocks in frame T+N in a search for uncertain blocks, all uncertain blocks in a list of uncertain blocks could be processed.

In one embodiment, dividing of blocks is stopped when the brightness (luminance) or color (chrominance) of a block is relatively uniform. The gradient of YUV or just Y is a measure of the uniformity of color and brightness, respectively. The Y gradient of the block is measured and compared to a gradient threshold, step 144. When the gradient is below the gradient threshold, the block is relatively uniform in brightness. Further sub-dividing of the block is halted. Instead the object contour is copied from the matching block of frame T to the block in frame T+N, step 146. The contour information is copied even when the block is a larger 8×8 or 16×16 block.

Halting block dividing when the gradient is small helps to minimize errors. When the block's gradient is small and the color or brightness is uniform, the pixels often can match many other blocks since there is little uniqueness in the block's pattern that can be matched. This lack of a larger gradient and a distinct pattern can cause aliasing errors because the low-gradient block may not produce accurate matches during motion estimation.

Often the edge of an object has a sharp change in color or brightness, while blocks within an object or in the background have a relatively uniform color or brightness. Thus the color or brightness gradient across a block is an indication of whether the object boundary passes through the object. Thus a secondary reason to halt further dividing of a block with a low gradient is because the block may not really contain the object boundary.

When a sufficiently large gradient is found within the block, step 144, the block is divided into smaller sub-blocks, step 148. For example, a 16×16 macroblock can be divided into four 8×8 sub-blocks, while an 8×8 block can be divided into four 4×4 sub-blocks. Dividing into other size blocks or regions such as triangles could also be substituted.

The newly-divided sub-blocks in frame T+N are then each motion estimated. A restricted search range in frame T helps to reduce aliasing errors that can arise from the reduced number of pixels in the smaller sub-block. The best-matching sub-block in frame T+N is found for each of the new sub-blocks, step 150. When the matching sub-block is within the object contour of frame T, the sub-block in frame T+N is added to the object mask being refined for frame T+N, step 152.

Sub-blocks that are uncertain (containing the object boundary) are further processed. When these sub-blocks are already at the minimum block size, such as 4×4, step 156, then the object contour information is copied from the matching sub-block in frame T to the sub-block in frame T+N, step 154. Processing of that sub-block ends and the next block or sub-block can be selected, step 142.

When the sub-block is not at the minimum block size, step 156, then it is checked to see if it is an uncertain sub-block, step 140. The gradient of uncertain sub-blocks can be checked, step 144, and the contour copied when the gradient is too small, step 146. For sub-blocks with a sufficiently large gradient, step 144, the sub-block can be further subdivided, step 148, and motion estimation repeated on the smaller sub-block, step 150.

Sub-blocks having matches within the object contour are certain sub-blocks and added to the object mask, step 152, while uncertain sub-blocks can be further subdivided if not yet at the minimum block size, step 156. When these sub-blocks are already at the minimum block size, such as 4×4, step 156, then the object contour information is copied from the matching sub-block in frame T to the sub-block in frame T+N, step 154. Processing of that sub-block ends and the next block or sub-block can be selected, step 142. More detail and examples of adaptive-block matching are provided in the parent application.

ALTERNATE EMBODIMENTS

Several other embodiments are contemplated by the inventors. A block or region can be marked or added to the object mask in a wide variety of ways, such as by setting a bit in a memory, or by adding a pointer, identifier, or address of the block to a list of blocks within the object mask, or by expanding a contour or bound of the object, etc. Object contours can be line segments along the object perimeter, or pixels along the perimeter, or can be defined in other ways. For example, the area within the contour may be stored as an object mask, either including the perimeter or excluding the perimeter, or all pixels within the object's predicted contour can be stored.

The variance minimized by clustering can be a sum of squared differences, absolute values, etc. The variance may not be at a true minimum value when the number of iterations is limited. Nerveless, the minimum obtained may be useful, even though not an absolute minimum but only a minimum of the iterations tested in a limited suite of possibilities.

When very little motion occurs, such as for a stationary object, tracking may be difficult. Problems can also occur when both the object and background have similar motions. These situations may be detected and disocclusion processing disabled to prevent errors.

Macroblock matching can compare differences in all color components such as YUV or RGB, or can just compare one or two components such as luminance Y. Gradients can likewise be calculated using all components YUV or just Y. Different search ranges and methods can be used when searching for the best-matching macroblock. For example, a diamond-shaped search pattern or a 3-point pattern may be more efficient than exhaustively searching a square region. Different search strategies can be used to further speed up the computation.

The gradient of a block can be defined in a variety of ways, such as the difference between the largest Y value and the smallest Y value, or the standard deviation of Y values in a block, or variance of Y values or color values, or other functions such as an energy function of the gradient. The gradient can be calculated for every pixel in the image. The gradient can be calculated along both the row and the column for every pixel. Since this produces a gradient value for every pixel, the average gradient for the block can be computed from the individual pixel gradients. Two averages can be used, such as an average gradient across the row and an average gradient across the column. These two gradient values can then be summed and divided by the number of pixels to give the average gradient for the block. Entropy or randomness measures can also be used as the gradient when deciding when to halt block dividing.

The direction of the video sequence could be reversed, and forward motion estimation or even bi-directional motion estimation could be substituted for backward motion estimation. Some frames may be forward estimated while others backward estimated. Frames that do not have motion vectors already generated could be skipped when the compression is performed before object tracking, or when a compressed video sequence is used as the input.

The methods may be applied to object tracking on an RGB or YUV-pixel video stream prior to compression by a standard such as MPEG-4. The methods may also be applied to content-retrieval applications using standards such as H.26L. Object tracking requires much less computational load since segmentation and watershed computations do not have to be performed on all frames. Only the very first frame in a long sequence of frames may need to be segmented to locate the object or objects to be tracked. Alternately, when very high motion occurs between two consecutive frames, then re-segmentation can be performed. Re-segmentation can also be performed on scene changes.

The occlusion and dis-occlusion routines can be varied and implemented in many ways. Optical flow is computationally expensive. Computational expense can be reduced by using block motion vectors. Adaptive block size minimizes blocking artifacts, which can otherwise limit the use of block-based methods.

Different numbers of frames can be skipped during modulation. For example, the number of frames before then next object mask is generated, N, can be set to values other than 3, such as 2 or 5 or many other values. Multiple thresholds can be used, such as adding a second very-low motion threshold that sets N to 10 while motions above the very-low motion threshold but below the regular threshold set N to 3. The motion-similarity thresholds could be adjusted depending on the motion speed or on the type of video sequence, (bright, dark, cluttered, sparse, interview, TV show, surveillance camera, etc.) or on a test of background or other object motions, or by other means.

Object contours can be line segments along the object perimeter, or pixels along the perimeter, or can be defined in other ways. For example, the area within the contour may be stored as an object mask, either including the perimeter or excluding the perimeter, or all pixels within the object's predicted contour can be stored.

The order of the steps can be varied, and further routines, selections, and categories can be added, such as for certain background and uncertain background, or even several kinds of background or secondary objects. Steps in program or process flows can often be re-arranged in order while still achieving the same or similar results.

For example, three possible modules that could be used for occlusion detection are:

Module 1: Clustering of previous frames results in similar backward prediction motion vectors.

Module 2: Clustering of future frames results in dissimilar backward prediction motion vectors.

Module 3: Energy of forward prediction of current frames is high.

In principle, any two of the modules described above could be used for occlusion detection. The motion vectors of the clusters can be compared to the average motion vectors of the suspect region in the description. However, the motion vectors of the clusters could be compared to each other directly or to a motion vector from a previous frame. Occlusion procedures can be reversed in time and used for disocclusion detection.

It is not necessary to process all macroblocks in frame T+N. For example, only a subset or limited area of each frame could be processed. It may be known in advance that the object only appears in a certain area of the frame, such as a moving car only appearing on the right side of a frame captured by a camera that has a highway on the right but a building on the left. The "frame" may be only a subset of the still image captured by a camera or stored or transmitted.

While the invention has been described in simplified terms as tracking foreground objects, any object may be tracked, whether a foreground or a background object. The background may consist of many objects moving in different directions.

While macroblocks such as 16×16 blocks and 8×8, and 4×4 sub-blocks have been described, other block sizes can be substitutes, such as larger 32×32 blocks, 16×8 blocks, etc. Non-square blocks can be used, and other shapes of regions such as triangles, circles, ellipses, hexagons, etc., can be used as the region or "block". Adaptive blocks need not be restricted to a predetermined geometrical shape. For example, the sub-blocks could correspond to content-dependent sub-objects within the object. Smaller block sizes can be used for very small objects for motion estimation and generating the average motion.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. § 1.72(b). Any advantages and benefits described may not apply to all embodiments of the invention. When the word "means" is recited in a claim element, Applicant intends for the claim element to fall under 35 USC § 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC § 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. An object tracker comprising:
   a backward motion estimator, receiving a base object location in a base frame, for generating backward motion vectors representing displacements from regions in a current frame to best-matching regions in the base frame;
   an object-location generator that generates a current object location for the current frame by including regions from the current frame that match best-matching regions in the base frame that are within the base object location and including sub-regions in the current frame matching best-matching sub-regions that are within the base object location;
   a forward motion estimator, receiving the current object location in the current frame, for generating forward motion vectors representing displacements to best-matching regions in a second frame from the current frame;
   an occlusion detector, receiving the forward motion vectors, the occlusion detector comprising:
      a forward difference generator that finds a suspect covered region in the current frame and within the current object location, the suspect covered region not having a best-matching region in the second frame;
      an object clusterer that divides regions in the current object location into a plurality of object clusters by minimizing variance of backward motion vectors of regions within an object cluster, each object cluster being represented by a centroid motion vector;
      a motion-similarity comparator that compares an average motion vector for the suspect covered region to the centroid motion vector for each object cluster and signals an occlusion when a minimum difference between the average motion vector and the centroid motion vectors is less than an occlusion threshold; and
      an occlusion remover that receives the current object location and removes the suspect covered region when the motion-similarity comparator signals the occlusion,
      whereby suspect covered regions are removed as occluded regions when the motion-similarity comparator signals the occlusion.

2. The object tracker of claim 1 further comprising:
   a disocclusion detector, receiving the centroid motion vectors from the object clusterer, and the backward and forward motion vectors, the disocclusion detector comprising:
      a backward difference generator that finds a suspect uncovered region in the current frame and outside the current object location, the suspect uncovered region not having a best-matching region in the base frame;
      a second motion-similarity comparator that compares an average motion vector for the suspect uncovered region to the centroid motion vector for each object cluster and signals a disocclusion when a minimum difference between the average motion vector and the centroid motion vectors is less than a disocclusion threshold; and a disocclusion adder that adds the suspect uncovered region to the current object location when the motion-similarity comparator signals the disocclusion, whereby suspect uncovered regions are added to the current object location as disoccluded regions when the motion-similarity comparator signals the disocclusion.

3. The object tracker of claim 2 further comprising:

a motion averager, receiving backward motion vectors from the backward motion estimator for regions that match best-matching regions that are within the base object location in the base frame, for generating an average object motion from the backward motion vectors for regions matching best-matching regions that are within the base object location but excluding the backward motion vectors for regions matching best-matching regions that are outside the base object location or not entirely within the base object location when generating the average object motion; and a motion modulator, receiving the average object motion from the motion averager, for comparing the average object motion to a motion threshold and adjusting a frame-skipping parameter to skip frames between the base frame and the current frame when the average object motion exceeds the motion threshold, but not skipping frames and processing sequential frames when the average object motion is below the motion threshold;

whereby frame skipping is modulated based on motion of regions matching within the base object location but not motion of regions matching outside or partially within the base object location.

4. The object tracker of claim 3 further comprising:

an adaptive region-size motion estimator, for sub-dividing regions in the base frame into sub-regions for regions matching best-matching regions that are partially within the base object location, for generating backward motion vectors representing displacements from sub-regions in the current frame to best-matching sub-regions in the base frame, whereby adaptive region-size matching along a boundary of the base object location in the base frame refines the current object location in the current frame.

5. The object tracker of claim 4 wherein the adaptive region-size motion estimator continues to sub-divide sub-regions into smaller sub-regions for sub-regions in the current frame best matching sub-regions in the base frame that are partially within the base object location, whereby sub-regions along the boundary of the current object location are further sub-divided to more precisely refine the boundary of the current object location.

6. The object tracker of claim 2 wherein the regions are macroblocks but the suspect covered regions and suspect uncovered regions are not macroblocks but have irregular and varying shapes.

7. The object tracker of claim 2 wherein the object clusterer performs a K-means clustering routine that adaptively sets a number K of clusters to minimize variance.

8. A computer-implemented disocclusion method for detecting new regions to add to an object mask that predicts an object location in a frame of a video sequence of frames comprising:

motion compensating an object mask for a base frame using a current frame in the video sequence to generate a compensated current frame;

finding differences greater than a threshold value between the current frame and the compensated current frame, the differences being suspect regions;

motion compensating an object mask for the current frame using a second frame in the video sequence to generate a second compensated current frame;

calculating an average motion vector between the current frame and the second frame for each suspect region;

dividing the object mask for the current frame into a plurality of object clusters, each object cluster containing a plurality of macroblocks each having a block motion vector representing motion of the macroblock;

generating a cluster centroid motion vector for each object cluster, the cluster centroid motion vector being an average of the block motion vectors for macroblocks within each object cluster;

for each suspect region, comparing the average motion vector for the suspect region to the cluster centroid motion vector of each object cluster to obtain a motion difference; and when the motion difference is below a threshold difference, adding the suspect region to the object mask as a disoccluded region;

whereby suspect regions with a small motion difference to a cluster centroid motion vector are added to the object mask during disocclusion processing.

9. The computer-implemented disocclusion method of claim 8 further comprising:

iterating allocation of macroblocks to object clusters using a K-means process to minimize variation of block motion vectors within object clusters, whereby the object mask is divided by K-means clustering.

10. The computer-implemented disocclusion method of claim 8 further comprising:

enlarging the object mask to generate an enlarged object mask;

discarding suspect regions outside of the enlarged object mask, whereby suspect regions far from the object mask are discarded.

11. The computer-implemented disocclusion method of claim 8 wherein the base frame is a frame prior to the current frame and the second frame is a frame after the current frame, whereby backward and forward motion estimation are used to detect disocclusion.

12. The computer-implemented disocclusion method of claim 11 wherein the base frame and the current frame are separated by one or more skipped frames when motion is below a modulation threshold, but the base frame and the current frame are successive frames without an intervening frame when motion is above the modulation threshold;

wherein the second frame and the current frame are separated by one or more skipped frames when motion is below the modulation threshold, but the second frame and the current frame are successive frames without an intervening frame when motion is above the modulation threshold, whereby processing is modulated wherein frames are skipped for low motion but not skipped for high motion.

13. The computer-implemented disocclusion method of claim 8 which further comprises occlusion processing which comprises:

motion compensating an object mask for the current frame using the second frame in the video sequence to generate the second compensated current frame;

finding differences greater than a threshold value between the current frame and the second compensated current frame, the differences within the object mask being suspect covered regions;

calculating an average motion vector between the current frame and the base frame for each suspect covered region;

for each suspect covered region, comparing the average motion vector for the suspect covered region to the cluster centroid motion vector of each object cluster to obtain a covered motion difference; and when the covered motion difference is below a covered threshold difference, removing the suspect covered region from the object mask as an occluded region;

whereby suspect covered regions with a small motion difference to a cluster centroid motion vector are removed from the object mask during occlusion processing.

14. The computer-implemented disocclusion method of claim 13 further comprising:

removing smaller suspect regions and smaller suspect covered regions by filtering.

15. The computer-implemented disocclusion method of claim 13 further comprising:

searching for matching base regions in the base frame that approximately match with current regions in the current frame;

determining when a matching base region is entirely within an object contour of the base frame and categorizing a matching current region in the current frame as a certain region;

determining when the object contour passes through the matching base region of the base frame and categorizing a matching current region in the current frame as an uncertain region;

for uncertain regions in the current frame, sub-dividing the uncertain region into a plurality of sub-regions that are each smaller than the uncertain region;

searching for matching base sub-regions in the base frame that approximately match with current sub-regions in the current frame;

determining when a matching base sub-region is entirely within the object contour of the base frame and categorizing a matching current sub-region in the current frame as a certain sub-region;

determining when the object contour passes through the matching base sub-region of the base frame and categorizing a matching current sub-region in the current frame as an uncertain sub-region; and generating a new object contour to include areas of certain regions and areas of certain sub-regions in the current frame, whereby uncertain regions along an object boundary are sub-divided to refine the new object contour.

16. A computer-program product comprising:

a computer-usable medium having computer-readable program code means embodied therein for tracking an object boundary in a video stream, the computer-readable program code means in the computer-program product comprising:

first motion estimation means for generating motion vectors for blocks of pixels in a current frame relative to a base frame;

base-frame block-boundary compare means for comparing a location of a matching block in the base frame to an object boundary in the base frame;

new object boundary means, coupled to the base-frame block-boundary compare means, for generating a new object boundary for the current frame, the new object boundary being drawn to include blocks in the current frame that match blocks in the base frame within the object boundary;

second motion estimation means for generating motion vectors for blocks of pixels in the current frame relative to a second frame that is not the base frame;

first difference means, coupled to the second motion estimation means, for locating a suspected covered region of pixels in the current frame that do not match a corresponding region of pixels in the second frame;

cluster means, receiving the new object boundary, for iteratively assigning blocks within the new object boundary to one or more clusters within the new object boundary, by reducing variance of motion vectors of blocks within a cluster;

centroid means, coupled to the cluster means, for generating a centroid motion vector that is an average of motion vectors for blocks within a cluster;

compare means, receiving the centroid motion vector, for comparing a motion vector of the suspected covered region to the centroid motion vector to determine when a difference in motion is below a threshold;

removal means, activated by the compare means, for removing pixels within the suspected covered region from the new object boundary to generate an updated object boundary when the difference in motion is below the threshold; and advancing frame means for advancing the video stream to select a next second frame, a next current frame, and a next base frame, the next base frame having an object boundary already computed but the next current frame not yet having an object boundary computed, whereby suspected covered regions are examined by motion comparison.

17. The computer-program product of claim 16 wherein the computer-readable program code means comprises:

second difference means, coupled to the first motion estimation means, for locating a suspected uncovered region of pixels in the current frame that do not match a corresponding region of pixels in the base frame;

second compare means, receiving the centroid motion vector from the centroid means, for comparing a motion vector of the suspected uncovered region to the centroid motion vector to determine when a difference in motion is within a second threshold; and adding means, activated by the second compare means, for adding pixels within the suspected uncovered region to the updated object boundary to generate a final object boundary when the difference in motion is within the second threshold, whereby suspected uncovered regions are examined by motion comparison.

18. The computer-program product of claim 17 wherein the computer-readable program code means comprises:

block categorization means, coupled to the base-frame block-boundary compare means, for identifying a current block in the current frame that has a motion vector to a matching block in the base frame as:

(1) a certain block when the matching block is located completely within the object boundary in the base frame;

(2) an uncertain block when the matching block is located partially within the object boundary but partially outside the object boundary in the base frame.

19. The computer-program product of claim 18 wherein the computer-readable program code means comprises:

adaptive block-size match means, coupled to receive the uncertain blocks, for splitting an uncertain block into a plurality of sub-blocks in the current frame;

sub-block motion estimation means for generating motion vectors for the sub-blocks of pixels in the current frame relative to the base frame;

base-frame sub-block-boundary compare means for comparing a location of a matching sub-block in the base frame to the object boundary in the base frame;

sub-block categorization means, coupled to the base-frame sub-block-boundary compare means, for identifying a current sub-block in the current frame that has a motion vector to a matching sub-block in the base frame as an uncertain sub-block when the matching sub-block is located partially within the object boundary but partially outside the object boundary in the base frame;

whereby object boundaries are generated by categorizing matching blocks linked by motion vectors and by splitting uncertain blocks on the object boundary into smaller blocks.

20. The computer-program product of claim 18 wherein the computer-readable program code means comprises:

average motion means, coupled to the first motion estimation means, for generating an average motion by combining motion vectors for certain blocks but not including motion vectors for uncertain blocks or for sub-blocks; and modulation means, coupled to receive the average motion from the average motion means, for causing the advancing frame means to select as a next current frame a next sequential frame after the base frame when the average motion exceeds a threshold, but for selecting as the next current frame a frame several frames separated from the base frame when the average motion does not exceeds the threshold, whereby frame advancement is modulated based on average motion of the certain blocks.

* * * * *